(12) United States Patent
Takahashi et al.

(10) Patent No.: US 11,268,882 B2
(45) Date of Patent: *Mar. 8, 2022

(54) SAFETY FENCE AND VEHICLE TESTING DEVICE

(71) Applicant: MEIDENSHA CORPORATION, Tokyo (JP)

(72) Inventors: Toshimichi Takahashi, Ota (JP); Shoki Suto, Ota (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/264,015

(22) PCT Filed: Mar. 6, 2019

(86) PCT No.: PCT/JP2019/008771
§ 371 (c)(1),
(2) Date: Jan. 28, 2021

(87) PCT Pub. No.: WO2020/026497
PCT Pub. Date: Feb. 6, 2020

(65) Prior Publication Data
US 2021/0262898 A1    Aug. 26, 2021

(30) Foreign Application Priority Data

Jul. 30, 2018 (JP) .............................. JP2018-142231

(51) Int. Cl.
*G01M 17/007* (2006.01)

(52) U.S. Cl.
CPC .... *G01M 17/0074* (2013.01); *G01M 17/0072* (2013.01)

(58) Field of Classification Search
CPC .......... G01M 17/0074; G01M 17/007; G01M 17/013; G01M 17/0072; F16P 1/00; E01F 13/00
See application file for complete search history.

(56) References Cited

U.S. PATENT DOCUMENTS

| | | | |
|---|---|---|---|
| 8,176,677 B1 | 5/2012 | Blackmon, III | |
| 10,393,627 B2 | 8/2019 | Etches et al. | |

(Continued)

FOREIGN PATENT DOCUMENTS

| | | | |
|---|---|---|---|
| CN | 106706336 A | 5/2017 | |
| JP | 58-021844 U | 2/1983 | |

(Continued)

OTHER PUBLICATIONS

USPTO Office Action, U.S. Appl. No. 16/975,780, filed Jan. 8, 2021, 16 pages.

(Continued)

*Primary Examiner* — Eric S. McCall
*Assistant Examiner* — Timothy P Graves
(74) *Attorney, Agent, or Firm* — Foley & Lardner LLP

(57) ABSTRACT

A safety fence for a vehicle testing device includes a fixed fence part structured to be arranged substantially in parallel with a wheel of a test vehicle, wherein the test vehicle is placed on a roller exposed through a roller opening of a pit cover. A first foldable fence part is attached to an end portion of the fixed fence part, and structured to swing outwardly of the fixed fence part. A second foldable fence part is attached to an end portion of the first foldable fence part, and structured to swing outwardly of the first foldable fence part. A third foldable fence part attached to a lower end portion of the fixed fence part, and structured to be arranged in parallel with the fixed fence part.

10 Claims, 4 Drawing Sheets

(56) References Cited

U.S. PATENT DOCUMENTS

| | | |
|---|---|---|
| 2018/0003590 A1 | 1/2018 | Etches et al. |
| 2020/0408642 A1 | 12/2020 | Takahashi et al. |
| 2021/0018399 A1 | 1/2021 | Takahashi et al. |

FOREIGN PATENT DOCUMENTS

| | | | |
|---|---|---|---|
| JP | 03-126617 U | | 12/1991 |
| JP | 5-11044 U | | 2/1993 |
| JP | 8-026649 A | | 1/1996 |
| JP | 2005-024430 A | | 1/2005 |
| JP | 2010-169485 A | | 8/2010 |
| JP | 2010169485 A | * | 8/2010 |
| JP | 2016-23413 A | | 2/2016 |

OTHER PUBLICATIONS

U.S. Appl. No. 16/975,456, filed Aug. 25, 2020, Meidensha Corporation.
U.S. Appl. No. 16/975,780, filed Aug. 26, 2020, Meidensha Corporation.
USPTO Final Office Action, U.S. Appl. No. 16/975,780, dated Apr. 23, 2021, 15 pages.
USPTO Notice of Allowance, U.S. Appl. No. 16/975,456, dated Mar. 10, 2021, 19 pages.
USPTO Notice of Allowance, U.S. Appl. No. 16/975,780, dated Jul. 8, 2021, 11 pages.

* cited by examiner

SAFETY FENCE AND VEHICLE TESTING DEVICE

TECHNICAL FIELD

The present invention relates to a safety fence for a vehicle testing device such as a chassis dynamometer for mounting a vehicle via rollers, and testing fuel efficiency, exhaust gas and others, and relates to a vehicle testing device including the safety fence.

BACKGROUND ART

A vehicle testing device is provided with a safety fence for preventing the occurrence of an accident where a person accidentally contacts a driving wheel when the driving wheel is rotating at high speed during vehicle testing operation (see patent documents 1 and 2).

Patent document 1 discloses a safety fence that is attached to a pit cover, and includes an angled fence that can be angled for preventing interference with an opening and closing door of a test vehicle, wherein the safety fence serves to prevent a person from entering a space between the safety fence and the test vehicle.

Patent document 2 discloses a safety fence that includes a vertical frame rod and a safety fence body mounted to the vertical frame rod, wherein the vertical frame rod is structured to slide on a slide rail provided in a vehicle testing device.

PRIOR ART DOCUMENT(S)

Patent Document(s)

Patent Document 1: Japanese Patent Application Publication No. 2010-169485
Patent Document 2: Japanese Utility Model Application Publication No. H5-11044

SUMMARY OF INVENTION

However, the safety fence according to patent document 1 includes a large fixed fence even with the angled fence held angled, so that if the vehicle and a test facility are compact, the safety fence may interfere with the vehicle door when the vehicle door is opened and closed, and thereby prevent the vehicle door from being fully opened.

On the other hand, the safety fence according to patent document 2 includes a structure in which the safety fence body is opened by rotation around the vertical frame rod. Accordingly, no auxiliary device (such as a driver aid) can be arranged in a space required to allow operation (opening and closing) of the safety fence.

The present invention has been made in view of the problems described above, and is targeted for providing a safety fence and a vehicle testing device including the same in which interference with a door of a test vehicle can be prevented regardless of the size of the test vehicle, without limiting the flexibility of layout of an auxiliary device provided for the vehicle testing device.

In view of the foregoing, according to an embodiment of the present invention, a safety fence for a vehicle testing device, includes: a fixed fence part structured to be arranged substantially in parallel with a wheel of a test vehicle, wherein the test vehicle is placed on a roller exposed through a roller opening of a pit cover; a first foldable fence part attached to an end portion of the fixed fence part, and structured to swing outwardly of the fixed fence part; and a second foldable fence part attached to an end portion of the first foldable fence part, and structured to swing outwardly of the first foldable fence part.

According to an embodiment of the present invention, the safety fence includes a third foldable fence part attached to a lower end portion of the fixed fence part, and structured to be arranged in parallel with the fixed fence part.

According to an embodiment of the present invention, the safety fence includes a fourth foldable fence part attached to a lower end portion of the second foldable fence part, and structured to be arranged in parallel with the second foldable fence part.

According to an embodiment of the present invention, the safety fence further includes: a support structured to support the fixed fence part; a first support member arranged at the support, and structured to additionally support the fixed fence part in parallel with the wheel of the test vehicle; and a second support member arranged at the support, and structured to support the first foldable fence part, the second foldable fence part, and the fourth foldable fence part in series with the fixed fence part.

According to an embodiment of the present invention, the safety fence further includes: a first angled fence part attached to an end portion of the fixed fence part, and structured to swing inwardly and outwardly of the fixed fence part; and a second angled fence part attached to an end portion of the second foldable fence part, and structured to swing inwardly and outwardly of the second foldable fence part.

According to an embodiment of the present invention, the safety fence further includes: a first angle adjustment plate structured to define a range of rotation of the first angled fence part; and a second angle adjustment plate structured to define a range of rotation of the second angled fence part.

According to an embodiment of the present invention, the safety fence further includes a connecting member structured to connect the first angle adjustment plate and the second angle adjustment plate to each other such that the fixed fence part and the second foldable fence part are arranged in parallel with each other.

According to an embodiment of the present invention, the safety fence further includes: a first hand knob structured to fix the first angled fence part to the first angle adjustment plate at a position in the range of rotation of the first angled fence part; and a second hand knob structured to fix the second angled fence part to the second angle adjustment plate at a position in the range of rotation of the second angled fence part.

According to an embodiment of the present invention, the safety fence is structured such that: the first angled fence part is structured to be positioned within a range of 270 degrees from a position parallel with the fixed fence part; and the second angled fence part is structured to be positioned within a range of 270 degrees from a position parallel with the second foldable fence part.

According to an embodiment of the present invention, the safety fence includes a part structured to be attached to the pit cover or a roller cover, wherein the safety fence extends along a peripheral edge of the roller opening.

According to an embodiment of the present invention, a vehicle testing device includes one of the foregoing safety fences.

According to the present invention, the safety fence and the vehicle testing device including the same can be prevented from interfering with a door of a test vehicle regard-

MODE(S) FOR CARRYING OUT INVENTION

The following describes embodiments of the present invention with reference to the drawings.

Figure 1:
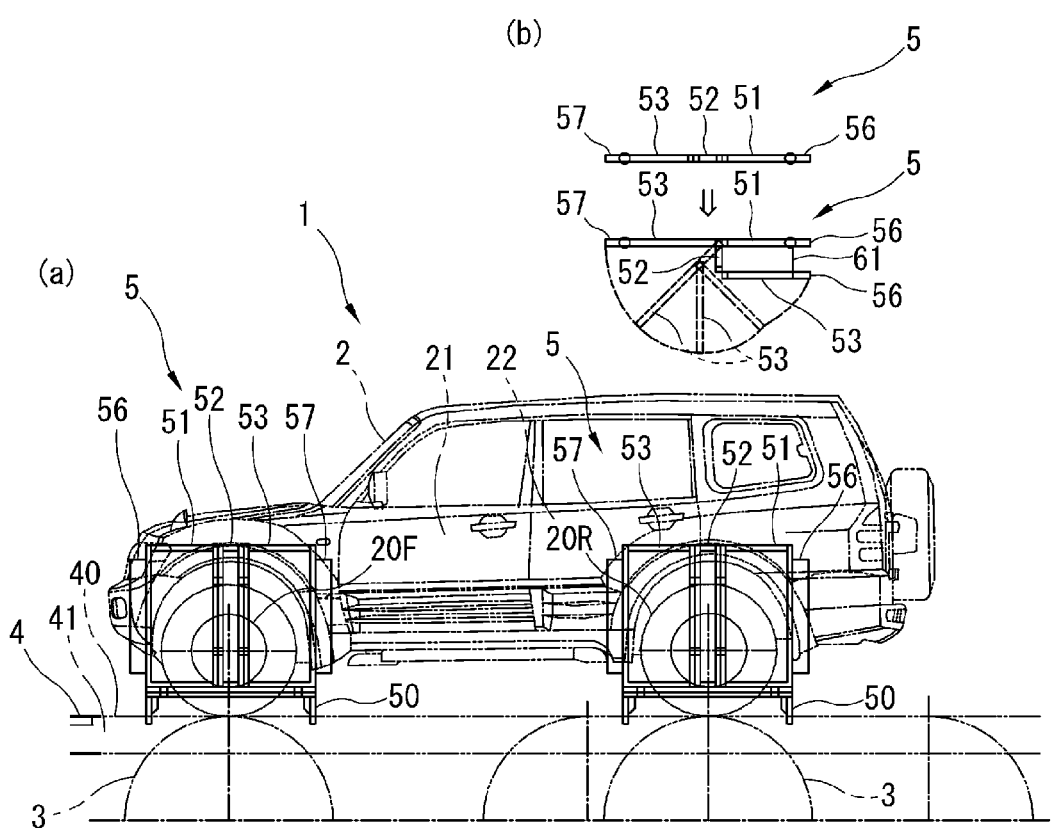
FIG. 1 shows (a) a schematic view of a safety fence according to a first example of the present invention, and (b) an explanatory view illustrating operation of the safety fence.

FIG. 1 shows a vehicle testing device 1 according to the present invention, which includes: a pit cover 4 including roller openings 40 through each of which a roller 3 is exposed, wherein a wheel 20 of a test vehicle 2 is mounted on the roller 3; and safety fences 5 arranged outside the test vehicle 2 and substantially in parallel with the wheels (front wheels 20F and rear wheels 20R).

Figure 3:
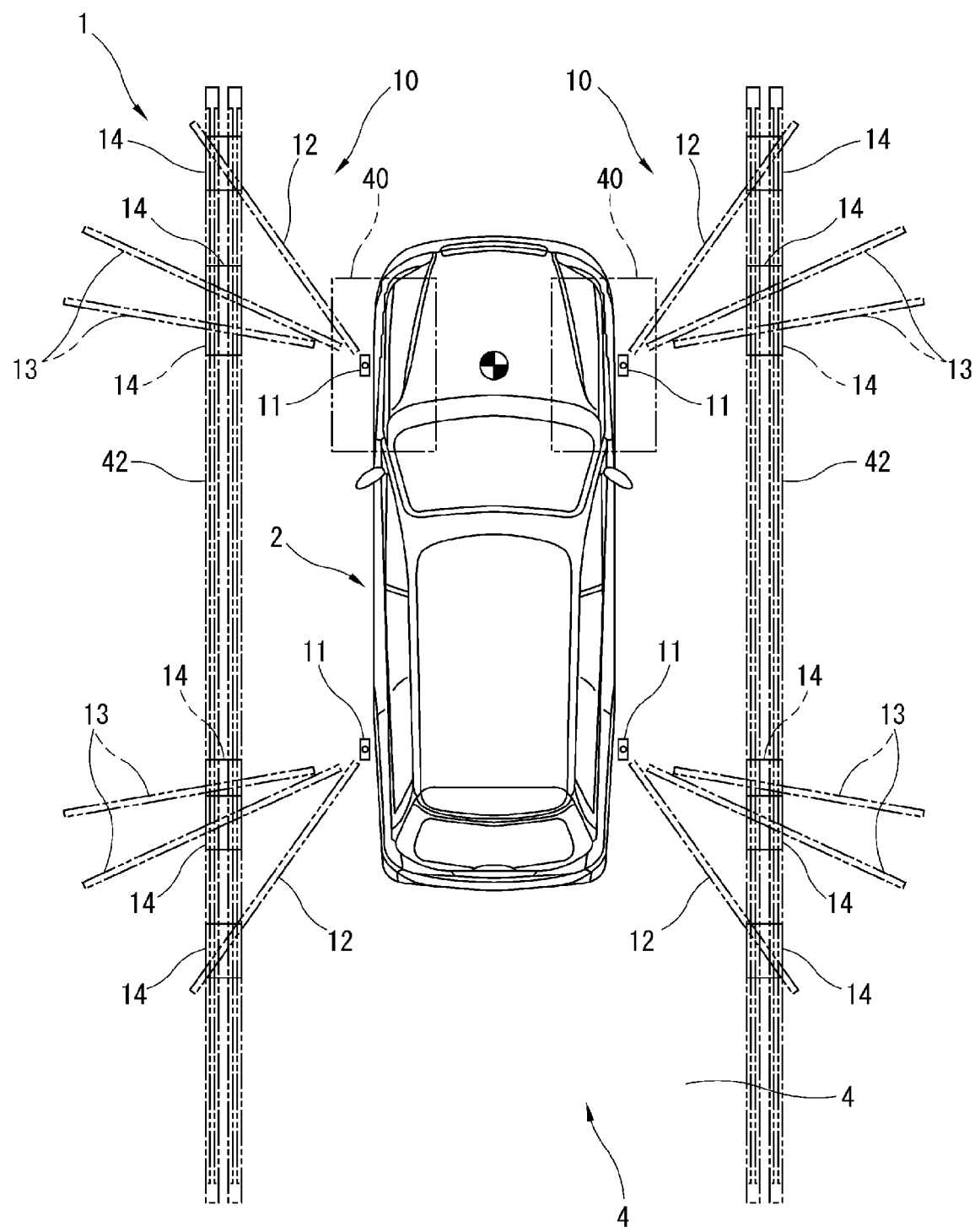
FIG. 3 is a top view illustrating a condition that a test vehicle is restrained in a vehicle testing device.

As shown in FIG. 3, the test vehicle 2 is restrained by vehicle restraining devices 10 each of which is connected to a wheel hub of the wheel 20 in the vehicle testing device 1. The safety fence 5 according to this embodiment serves to prevent physical interference with the vehicle restraining device 10.

Figure 2:
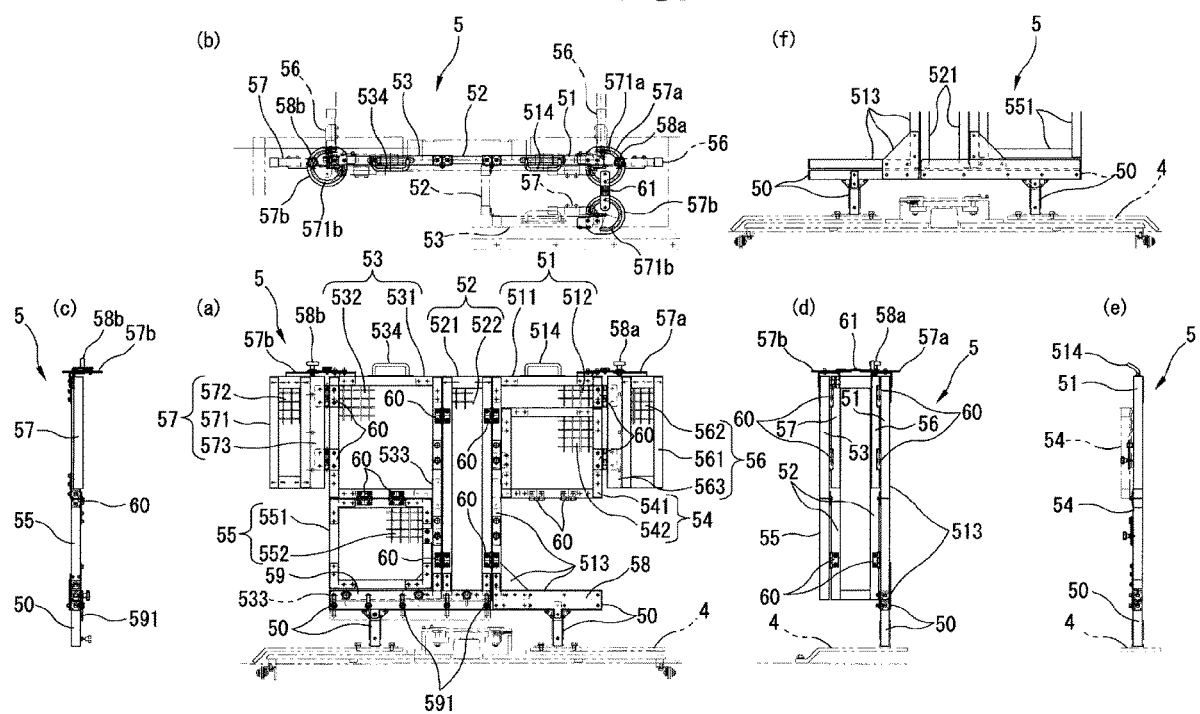
FIG. 2 shows (a) a front view of a safety fence according to a second example of the present invention, (b) a plan view of the safety fence, (c) a side view of the safety fence from a position facing its first end side, (d) a side view of the safety fence in a folded state from a position facing its second end side, (e) a side view of the safety fence in an unfolded state from the position facing its second end side, and (f) a rear view of a lower part of the safety fence.

<Examples of Safety Fence 5> As shown in FIGS. 1 and 2, the safety fence 5 is attached to the pit cover 4 along a peripheral edge of one of the roller openings 40 corresponding to each wheel 20 of the test vehicle 2 shown in FIG. 1. The following describes first and second examples of the safety fence 5 specifically.

<First Example of Safety Fence 5> As shown in FIG. 1, the safety fence 5 according to the first example includes a fixed fence part 51, a first foldable fence part 52, a second foldable fence part 53, and a first angled fence part 56, and a second angled fence part 57.

The fixed fence part 51 is disposed substantially in parallel with the wheel (the front wheel 20F, the rear wheel 20R) of the test vehicle 2 mounted on the roller 3 exposed through the roller opening 40 of the pit cover 4. The fixed fence part 51 is supported upright by a support 50 attached to the pit cover 4.

As shown in FIG. 1 (b), the first foldable fence part 52 is attached to an end portion of the fixed fence part 51, and structured to swing outwardly of the fixed fence part 51.

The second foldable fence part 53 is attached to an end portion of the first foldable fence part 52, and structured to swing outwardly of the first foldable fence part 52.

The first angled fence part 56 is attached to an end portion of the fixed fence part 51, and structured to swing inwardly and outwardly of the fixed fence part 51.

The second angled fence part 57 is attached to an end portion of the second foldable fence part 53, and structured to swing inwardly and outwardly of the second foldable fence part 53.

<Second Example of Safety Fence 5> As shown in FIG. 2, the safety fence 5 according to the second example includes a fixed fence part 51, a first foldable fence part 52, a second foldable fence part 53, and a third foldable fence part 54, a fourth foldable fence part 55, a first angled fence part 56, a second angled fence part 57, a first support member 58, and a second support member 59.

<Example of Fixed fence part 51> The fixed fence part 51 is disposed substantially in parallel with the wheel 20 of the test vehicle 2 mounted on the roller 3 exposed through the roller opening 40 of the pit cover 4.

As shown in FIG. 2 (a) (f), the fixed fence part 51 includes: a substantially rectangular frame 511 made of a steel material; a welded wire netting 512 mounted to the frame 511; and an L-shaped frame support part 513 structured to support the frame 511 in a predetermined height position while being held upright on a support 50 attached to the pit cover 4.

Furthermore, the fixed fence part 51 is provided with a handle 514 for carrying the safety fence 5, and a first angle adjustment plate 57a for defining a range of rotation of the first angled fence part 56.

As shown in FIG. 2 (b), the first angle adjustment plate 57a is formed with a slot 571a through which a rotation shaft of a first hand knob 58a is inserted for fixing the first angled fence part 56 to the first angle adjustment plate 57a. The slot 571a is arc-shaped and defines a range of rotation of the first angled fence part 56 from a position in parallel with the fixed fence part 51 to a position at 270 degrees in a horizontal direction.

<Example of First foldable fence part 52> The first foldable fence part 52 is attached to an end portion of the fixed fence part 51, and structured to swing outwardly of the fixed fence part 51.

The first foldable fence part 52 includes: a rectangular frame 521 longer and narrower than the frame 511 of the fixed fence part 51; and a welded wire netting 522 mounted to the frame 521.

The frame 521 is connected to the frame support 513 of the fixed fence part 51 via a hinge part 60, and structured to swing outwardly of the fixed fence part 51.

<Example of Second Foldable Fence Part 53> The second foldable fence part 53 is attached to an end portion of the first foldable fence part 52, and structured to swing outwardly of the first foldable fence part 52.

The second foldable fence part 53 includes: a frame 531 identical in specifications to the frame 511; a welded wire netting 532 identical in specifications to the welded wire netting 512; a frame support part 533 structured to support the frame 531 in a predetermined height position (identical in height to the frame 511) while being held upright by the support 50.

The frame support part 533 is structured to have the same specifications as the frame support part 513, and connected to an end portion of the frame 521 of the first foldable fence part 52 via a hinge part 60, and structured to swing outwardly of the first foldable fence part 52.

Furthermore, the second foldable fence part 53 is provided with a handle 534 for carrying the safety fence 5, and a second angle adjustment plate 57*b* for defining a range of rotation of the second angled fence part 57.

As shown in FIG. 2 (*b*), the second angle adjustment plate 57*b* is formed with a slot 571*b* through which a rotation shaft of a second hand knob 58*b* is inserted for fixing the second angled fence part 57 to the second angle adjustment plate 57*b*. The slot 571*b* is arc-shaped and defines a range of rotation of the second angled fence part 57 from a position in parallel with the second foldable fence part 53 to a position at 270 degrees in the horizontal direction.

<Example of Third Foldable Fence Part 54> The third foldable fence part 54 is attached to a lower end portion of the fixed fence part 51, and structured to be arranged in parallel with the fixed fence part 51.

The third foldable fence part 54 includes: a substantially square frame 541 structured to be arranged between the frame 511 of the fixed fence part 51 and the frame support 513; and a welded wire netting 542 mounted to the frame 541.

The frame 541 is formed to be substantially identical in shape to the frame 511 of the fixed fence part 51, and is connected to the frame 511 of the fixed fence part 51 via a hinge part 60, and structured to swing outwardly of the fixed fence part 51.

<Example of Fourth Foldable Fence Part 55> The fourth foldable fence part 55 is attached to a lower end portion of the second foldable fence part 53, and structured to be arranged in parallel with the second foldable fence part 53.

The fourth foldable fence part 55 includes: a substantially square frame 551 structured to be arranged between the frame 531 of the second foldable fence part 53 and the frame support 533; and a welded wire netting 552 mounted to the frame 551.

The frame 551 is connected to the frame 531 via the hinge part 60, and structured to swing in the vertical direction, and be arranged in parallel with the frame 531 of the second foldable fence part 53.

<Example of First Angled Fence Part 56> The first angled fence part 56 is attached to an end portion of the fixed fence part 51, and structured to swing inwardly and outwardly of the fixed fence part 51.

The first angled fence part 56 includes: a rectangular frame 561 shorter and narrower than the frame 511 of the fixed fence part 51; a welded wire netting 562 having the same specifications as the fixed fence part 51; and a connecting member 563 extending along a long side of the frame 561.

The connecting member 563 is connected to an end portion of the frame 511 via a hinge part 60. Furthermore, the connecting member 563 includes an upper end portion structured such that the first hand knob 58*a* is screwed via the first angle adjustment plate 57*a* to the upper end portion.

<Example of Second Angled Fence Part 57> The second angled fence part 57 is attached to an end portion of the second foldable fence part 53, and structured to swing inwardly and outwardly of the second foldable fence part 53.

The second angled fence part 57 includes: a rectangular frame 571 shorter and narrower than the frame 531 of the second foldable fence part 53; a welded wire netting 572 having the same specifications as the fixed fence part 51; and a connecting member 573 extending along a long side of the frame 571.

The connecting member 573 is connected to an end portion of the frame 531 via a hinge part 60. Furthermore, the connecting member 573 includes an upper end portion structured such that the second hand knob 58*b* is screwed via the second angle adjustment plate 57*b* to the upper end portion.

As shown in FIG. 2 (*b*), the first angle adjustment plate 57*a* or the second angle adjustment plate 57*b* is provided with a connecting member 61 structured to connect the first angle adjustment plate 57*a* and the second angle adjustment plate 57*b* so as to place the second foldable fence part 53 and the fixed fence part 51 in parallel with each other.

<Example of First Support Member 58> At a side face of the support 50, the first support member 58 additionally supports the fixed fence part 51 on the support 50 substantially in parallel as described above.

As shown in FIG. 2 (*a*) (*d*), the first support member 58 is made of a substantially L-shaped plate steel material (for example, stainless steel), and attached to side surfaces of the support 50 and the frame support part 513 in the same plane.

<Example of Second Support Member 59> The second support member 59 is disposed at an upper face of the support 50, and structured to support the first foldable fence part 52, the second foldable fence part 53, and the fourth foldable fence part 55 in series with the fixed fence part 51.

As shown in FIG. 2 (*a*), the second support member 59 is made of steel (stainless steel) to have a rectangular plate shape, and is structured to move in the vertical direction on the side faces of the support 50 and the frame support part 533 in the same plane.

For example, when the first foldable fence part 52, the second foldable fence part 53, and the fourth foldable fence part 55 are arranged in series with the fixed fence part 51, the second support member 59 is fixed to the side surfaces of the frame 521 of the support 50 and the frame support part 533 by a fixing tool 591 such as a bolt.

On the other hand, when the first foldable fence part 52, the second foldable fence part 53, and the fourth foldable fence part 55 are folded outside the fixed fence part 51, the second support member 59 is fixed to the side face of the support 50 by the fixing tool 591 below the frame 521 and the frame support part 533.

<Example of Vehicle Restraining Device 10> As shown in FIG. 3, the vehicle restraining device 10 includes: a hub connecting part 11 attached to the wheel hub of the wheel 20 of the test vehicle 2; a wheel hub rod 12 connected rotatably to the hub connecting part 11; and a fixing rod 13 connected rotatably close to an end portion of the wheel hub rod 12 closer to the hub connecting part 11.

As shown in FIG. 3, the wheel hub rod 12 and the fixing rod 13 are held by a rod holder 14 that is mounted to an arbitrary position on a slide rail 42 of the vehicle testing device 1.

Figure 4:
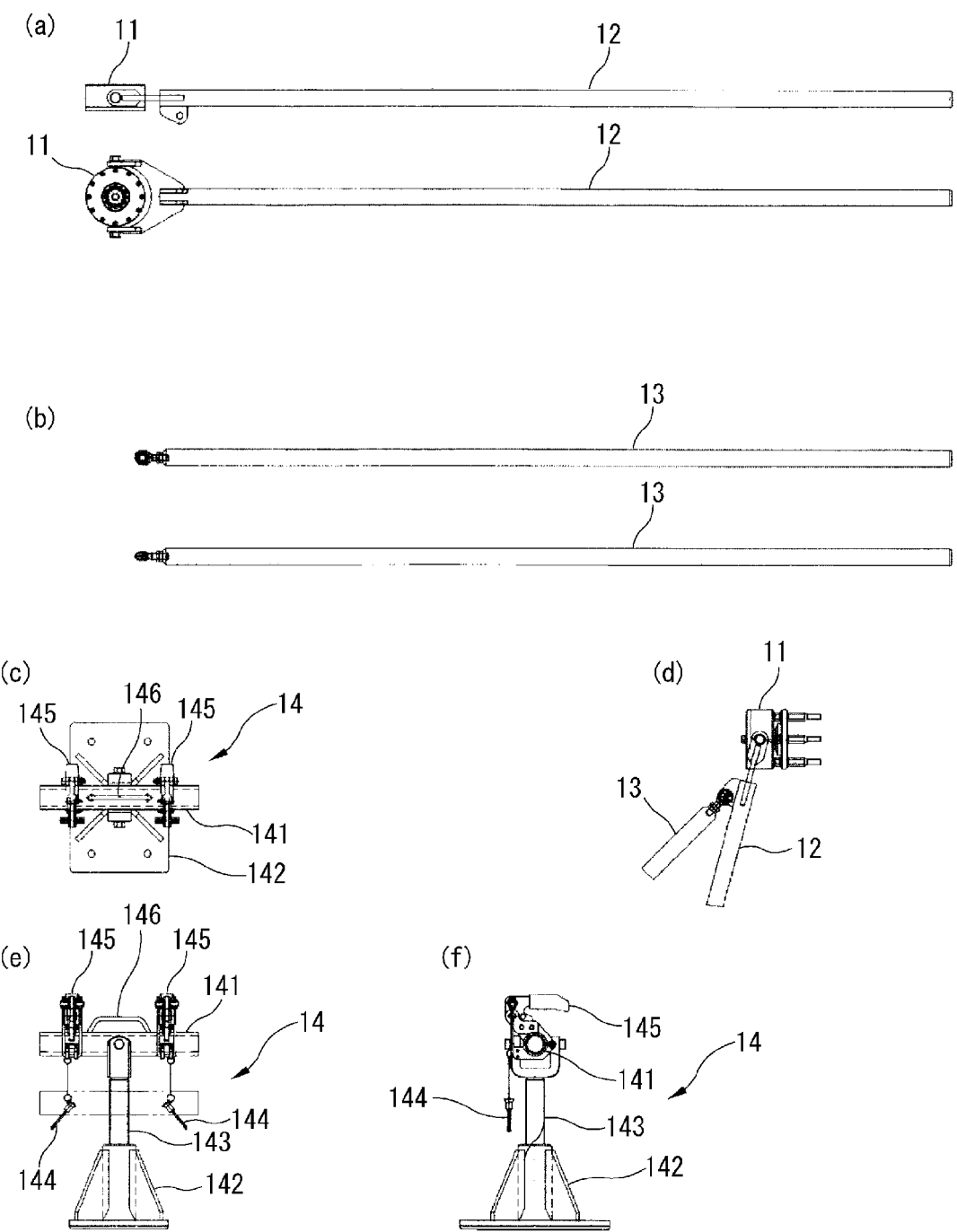
FIG. 4 shows (a) a side view and a plan view of a wheel hub rod of the vehicle testing device, (b) a side view and a plan view of a fixing rod of the vehicle testing device, (c) a plan view of a rod holder of the vehicle testing device, (d) a plan view showing a condition where the wheel hub rod is connected to a hub connecting part of the vehicle testing device, (e) a front view of the rod holder, and (f) a side view of the rod holder.

As shown in FIG. 4, the rod holder 14 includes: a sleeve 141 through which the wheel hub rod 12 or the fixing rod 13 is inserted; a pedestal 142 structured to be fixed to the slide rail 42; and a column 143 structured to support the sleeve 141 rotatably in a vertical plane while being held upright on the pedestal 142.

A lock pin 144 is inserted into the sleeve 141 through which the wheel hub rod 12 or the fixing rod 13 is inserted, and is structured to prevent the wheel hub rod 12 or the fixing rod 13 from deviating.

A pair of clamps 145 are provided near corresponding ends of the sleeve 141, and structured to clamp the wheel hub rod 12 or the fixing rod 13. Furthermore, a handle 146 is provided at a central part of the sleeve 141, for carrying the rod holder 14.

<Example of Use of Safety Fence 5> The following describes an example of use of the safety fence 5 according to the present embodiment with reference to FIGS. 1 and 4, in particular, an example of use of the safety fence 5 according to the second example shown in FIG. 2.

As shown in FIG. 1, the test vehicle 2 is placed on the pit 41. When the wheel 20 of the test vehicle 2 is placed on the roller 3, the safety fence 5 may be attached to or removed from the pit cover 4. When the safety fence 5 is attached, the support 50 of the safety fence 5 is fixed at a predetermined position on the pit cover 4 as shown in FIG. 2 (*a*), so that the safety fence 5 is arranged and fixed along a peripheral edge of the roller opening 40 of the pit cover 4 shown in FIGS. 1 and 3.

In particular, when the safety fence 5 is arranged substantially in parallel with the front wheel 20F of the test vehicle 2, the fixed fence part 51 is located at a position closer to the front end of the front wheel 20F of the test vehicle 2.

On the other hand, when the safety fence 5 is arranged substantially in parallel with the rear wheel 20R of the test vehicle 2, the fixed fence part 51 is located at a position closer to the rear end of the rear wheel 20R.

Next, with regard to the safety fence 5 for the rear wheel 20R, the third foldable fence part 54 is folded upward and arranged in parallel with the fixed fence part 51. Similarly, the fourth foldable fence part 55 is folded upward and arranged in parallel with the second foldable fence part 53.

When the first foldable fence part 52 and the second foldable fence part 53 are folded outside the fixed fence part 51, the second support member 59 shown in FIG. 2 (*a*) is fixed to the side face of the support 50 by the fixing tool 591 below the frame 521 and the frame support part 533. This allows the first foldable fence part 52 and the second foldable fence part 53 to be folded outside the fixed fence part 51.

Then, as shown in FIG. 2 (*d*), after the first foldable fence part 52 is rotated to the outside of the fixed fence part 51, the first angle adjustment plate 57*a* closer to the fixed fence part 51 and the second angle adjustment plate 57*b* closer to the second foldable fence part 53 are connected to each other by the connecting member 61. Under this condition, as shown in FIG. 2 (*d*), the fixed fence part 51 and the second foldable fence part 53 are arranged in parallel with each other via the first foldable fence part 52.

Also, with regard to the safety fence 5 for the front wheel 20F, by similar operation, under a condition that the first foldable fence part 52 and the second foldable fence part 53 are folded, the fixed fence part 51 and the second foldable fence part 53 are arranged in parallel with each other via the first foldable fence part 52.

The foregoing operation of the safety fence 5 allows the vehicle restraining device 10 to be connected to the wheel hub of the wheel 20 of the test vehicle 2. The following describes an example of connecting operation of the vehicle restraining device 10.

As shown in FIG. 3, the hub connecting part 11 of the vehicle restraining device 10 is attached to the wheel hub of the wheel 20 of the test vehicle 2, and the wheel hub rod 12 is connected to the hub connecting part 11. The fixing rod 13 is beforehand connected close to an end of the wheel hub rod 12. Then, the wheel hub rod 12 and the fixing rod 13 are each held by the rod holder 14 placed at an arbitrary position on the slide rail 42 of the vehicle testing device 1.

Thereafter, when the connection between the first angle adjustment plate 57*a* and the second angle adjustment plate 57*b* by the connecting member 61 is released, the second foldable fence part 53 and the fourth foldable fence part 55 are arranged in series with the fixed fence part 51, as shown in FIG. 2 (*a*). Under this condition, the second support member 59 is fixed to the side faces of the support 50, the frame 521, and the frame support 533 by the fixing tool 591. This allows the first foldable fence part 52, the second foldable fence part 53, and the fourth foldable fence part 55 to be stably supported in series with the fixed fence part 51.

The safety fence 5 according to the first example is also attached to the pit cover 4 of the vehicle testing device 1 by the same process as the safety fence 5 according to the second example.

<Effects of Present Embodiment> With the safety fence 5 according to the first or second example, when a front door 21 or rear door 22 of the test vehicle 2 is opened and closed, it is possible to prevent interference between the safety fence 5 and the front door 21 or rear door 22 by operation of the first foldable fence part 52, the second foldable fence part 53, the third foldable fence part 54, the fourth foldable fence part 55, the first angled fence part 56, and the second angled fence part 57. In particular, it is possible to move the center of the safety fence 5 from the wheel base of the test vehicle 2 to the outside of the test vehicle 2, and thereby expand the range of opening and closing of the front door 21 or rear door 22 of the test vehicle 2 prepared for the vehicle testing device 1.

Furthermore, with regard to the safety fence 5 for the front wheel 20F, the fixed fence part 51 is arranged at a position closer to the front end of the front wheel 20F of the test vehicle 2, substantially in parallel with the front wheel 20F. With regard to the safety fence 5 for the rear wheel 20R, the fixed fence part 51 is arranged at a position closer to the rear of the rear wheel 20R of the test vehicle 2, substantially in parallel with the rear wheel 20R. In addition, the first foldable fence part 52, the second foldable fence part 53, the third foldable fence 54, and the fourth foldable fence part 55 can be rotated and folded to the outside of the fixed fence part 51. This serves to flexibly adapt to test vehicles 2 various in size, and further enhance the flexibility described above.

Furthermore, if the safety fence 5 is composed of steel materials such as aluminum frames, the safety fence 5 can be made relatively light and compact. This serves to allow the safety fence 5 to be more easily detached for maintenance than conventional safety fences, and further easily carried by the handles 514, 534.

Furthermore, the feature of the safety fence 5 that the first foldable fence part 52, the second foldable fence part 53, the third foldable fence 54, and the fourth foldable fence part 55 are structured to be folded and arranged in parallel with the fixed fence part 51, serves to ensure an empty space at the lower side of the safety fence 5, particularly, below the fixed fence part 51.

Therefore, even when a vehicle restraining device of a wheel hub connection type like the vehicle restraining device 10 shown in FIG. 3 is employed by the vehicle testing device 1, it is possible to prevent physical interference between the safety fence 5 and the wheel hub rod 12 and the fixing rod 13 of the vehicle restraining device 10. Furthermore, it enhances the efficiency of workability when the wheel hub rods 12 of the vehicle restraining device 10 are attached to the wheel hubs of the front wheel 20F and the rear wheel 20R of the test vehicle 2.

The safety fence 5 may not be necessarily attached to the pit cover 4 but may be attached to the roller cover of the roller 3. This also serves to produce the effects described above, and prevent entry of a person into a space between the test vehicle 2 and the safety fence 5.

Furthermore, the feature that the frame support part 513 can be attached to the pit cover 4 or the roller cover, serves to allow the safety fence 5 to be applied to an existing vehicle testing device. In particular, the safety fence 5 can be quickly and firmly attached to the pit cover 4 or the roller cover by the fixing tool 6.

The present invention is not limited to the foregoing embodiments, but may be implemented in various forms within the scope of the claims of the present invention. Specifically, the safety fence according to the present invention is not limited to the first and second examples, but is may be formed appropriately in accordance with various vehicle testing devices, vehicle restraining devices, and vehicle test systems. For example, with regard to the configuration of FIG. 2, the safety fence 5 may be composed of the fixed fence part 51, the first foldable fence part 52, the second foldable fence part 53, and the fourth foldable fence part 55, or may be composed of the fixed fence part 51, the first foldable fence part 52, the second foldable fence part 53, and the third foldable fence part 54. These embodiments also belong to the technical scope of the present invention.

The invention claimed is:

1. A safety fence for a vehicle testing device, comprising:
   a fixed fence part structured to be arranged substantially in parallel with a wheel of a test vehicle, wherein the test vehicle is placed on a roller exposed through a roller opening of a pit cover;
   a first foldable fence part attached to an end portion of the fixed fence part, and structured to swing outwardly of the fixed fence part;
   a second foldable fence part attached to an end portion of the first foldable fence part, and structured to swing outwardly of the first foldable fence part;
   a third foldable fence part attached to a lower end portion of the fixed fence part, and structured to be arranged in parallel with the fixed fence part; and
   a fourth foldable fence part attached to a lower end portion of the second foldable fence part, and structured to be arranged in parallel with the second foldable fence part.

2. The safety fence as claimed in claim 1, further comprising:
   a support structured to support the fixed fence part;
   a first support member arranged at the support, and structured to additionally support the fixed fence part in parallel with the wheel of the test vehicle; and
   a second support member arranged at the support, and structured to support the first foldable fence part, the second foldable fence part, and the fourth foldable fence part in series with the fixed fence part.

3. A safety fence for a vehicle testing device, comprising:
   a fixed fence part structured to be arranged substantially in parallel with a wheel of a test vehicle, wherein the test vehicle is placed on a roller exposed through a roller opening of a pit cover;
   a first foldable fence part attached to an end portion of the fixed fence part, and structured to swing outwardly of the fixed fence part;
   a second foldable fence part attached to an end portion of the first foldable fence part, and structured to swing outwardly of the first foldable fence part;
   a third foldable fence part attached to a lower end portion of the fixed fence part, and structured to be arranged in parallel with the fixed fence part;
   a first angled fence part attached to an end portion of the fixed fence part, and structured to swing inwardly and outwardly of the fixed fence part; and
   a second angled fence part attached to an end portion of the second foldable fence part, and structured to swing inwardly and outwardly of the second foldable fence part.

4. The safety fence as claimed in claim 3, further comprising:
   a first angle adjustment plate structured to define a range of rotation of the first angled fence part; and
   a second angle adjustment plate structured to define a range of rotation of the second angled fence part.

5. The safety fence as claimed in claim 4, further comprising a connecting member structured to connect the first angle adjustment plate and the second angle adjustment plate to each other such that the fixed fence part and the second foldable fence part are arranged in parallel with each other.

6. The safety fence as claimed in claim 4, further comprising:
   a first hand knob structured to fix the first angled fence part to the first angle adjustment plate at a position in the range of rotation of the first angled fence part; and
   a second hand knob structured to fix the second angled fence part to the second angle adjustment plate at a position in the range of rotation of the second angled fence part.

7. The safety fence as claimed in claim 6, wherein:
   the first angled fence part is structured to be positioned within a range of 270 degrees from a position parallel with the fixed fence part; and
   the second angled fence part is structured to be positioned within a range of 270 degrees from a position parallel with the second foldable fence part.

8. A safety fence for a vehicle testing device, comprising:
   a fixed fence part structured to be arranged substantially in parallel with a wheel of a test vehicle, wherein the test vehicle is placed on a roller exposed through a roller opening of a pit cover;
   a first foldable fence part attached to an end portion of the fixed fence part, and structured to swing outwardly of the fixed fence part;
   a second foldable fence part attached to an end portion of the first foldable fence part, and structured to swing outwardly of the first foldable fence part;
   a third foldable fence part attached to a lower end portion of the fixed fence part, and structured to be arranged in parallel with the fixed fence part; and
   a part structured to support the fixed fence part, wherein the part attaches the fixed fence part to the pit cover or a roller cover.

9. A safety fence for a vehicle testing device, comprising:
   a fixed fence part structured to be arranged substantially in parallel with a wheel of a test vehicle, wherein the test vehicle is placed on a roller exposed through a roller opening of a pit cover;
   a first foldable fence part attached to an end portion of the fixed fence part, and structured to swing outwardly of the fixed fence part;
   a second foldable fence part attached to an end portion of the first foldable fence part, and structured to swing outwardly of the first foldable fence part;
   a fourth foldable fence part attached to a lower end portion of the second foldable fence part, and structured to be arranged in parallel with the second foldable fence part;
   a support structured to support the fixed fence part;

a first support member arranged at the support, and structured to additionally support the fixed fence part in parallel with the wheel of the test vehicle; and a second support member arranged at the support, and structured to support the first foldable fence part, the second foldable fence part, and the fourth foldable fence part in series with the fixed fence part.

10. A safety fence for a vehicle testing device, comprising:

a fixed fence part structured to be arranged substantially in parallel with a wheel of a test vehicle, wherein the test vehicle is placed on a roller exposed through a roller opening of a pit cover;

a first foldable fence part attached to an end portion of the fixed fence part, and structured to swing outwardly of the fixed fence part;

a second foldable fence part attached to an end portion of the first foldable fence part, and structured to swing outwardly of the first foldable fence part;

a first angled fence part attached to an end portion of the fixed fence part, and structured to swing inwardly and outwardly of the fixed fence part;

a second angled fence part attached to an end portion of the second foldable fence part, and structured to swing inwardly and outwardly of the second foldable fence part;

a first angle adjustment plate structured to define a range of rotation of the first angled fence part;

a second angle adjustment plate structured to define a range of rotation of the second angled fence part; and a connecting member structured to connect the first angle adjustment plate and the second angle adjustment plate to each other such that the fixed fence part and the second foldable fence part are arranged in parallel with each other.

\* \* \* \* \*